(12) United States Patent
Tople et al.

(10) Patent No.: US 8,779,081 B2
(45) Date of Patent: Jul. 15, 2014

(54) PROCESS FOR FORMATION OF POLY(ARYLENE ETHERS) WITH LOWER FINE PARTICLE CONTENT

(75) Inventors: Nitin Vilas Tople, Delmar, NY (US); Gerardo Rocha-Galicia, Clifton Park, NY (US); Hua Guo, Selkirk, NY (US)

(73) Assignee: SABIC Global Technologies B.V., Pittsfield, MA (US)

( * ) Notice: Subject to any disclaimer, the term of this patent is extended or adjusted under 35 U.S.C. 154(b) by 328 days.

(21) Appl. No.: 13/048,225

(22) Filed: Mar. 15, 2011

(65) Prior Publication Data

US 2011/0160421 A1 Jun. 30, 2011

(51) Int. Cl.
*C08G 63/18* (2006.01)

(52) U.S. Cl.
USPC ........... 528/193; 528/201; 528/190; 528/496; 528/86

(58) Field of Classification Search
USPC ............................ 528/193, 190, 201, 496, 86
See application file for complete search history.

(56) References Cited

U.S. PATENT DOCUMENTS

| | | | |
|---|---|---|---|
| 3,306,874 A | 2/1967 | Hay et al. | |
| 3,306,875 A | 2/1967 | Hay et al. | |
| 3,432,469 A | 3/1969 | Hay et al. | |
| 3,838,102 A | 9/1974 | Bennett et al. | |
| 3,923,738 A | 12/1975 | Van Sorge et al. | |
| 4,092,294 A | 5/1978 | Bennett et al. | |
| 4,755,566 A | 7/1988 | Yates et al. | |
| 4,806,297 A | 2/1989 | Brown et al. | |
| 4,806,602 A | 2/1989 | White et al. | |
| 5,068,310 A | 11/1991 | Shaffer et al. | |
| 5,294,654 A | 3/1994 | Hellstern-Burnell et al. | |
| 6,316,592 B1 | 11/2001 | Bates et al. | |
| 6,407,200 B1 | 6/2002 | Singh et al. | |
| 6,787,633 B2 | 9/2004 | Peemans et al. | |
| 7,151,158 B2 | 12/2006 | Ingelbrecht et al. | |
| 7,205,307 B2 | 4/2007 | McNaughton-Smith et al. | |
| 7,205,377 B2 | 4/2007 | Ingelbrecht et al. | |
| 2004/0054121 A1 | 3/2004 | Peemans et al. | |
| 2006/0069229 A1* | 3/2006 | Ingelbrecht et al. | 528/212 |
| 2011/0003962 A1 | 1/2011 | Carrillo et al. | |

FOREIGN PATENT DOCUMENTS

| | | |
|---|---|---|
| EP | 0594249 | 4/1994 |
| EP | 1209183 | 5/2002 |
| JP | 2001-122962 | 5/2001 |
| WO | 03000769 | 1/2003 |
| WO | 2007050077 | 5/2007 |
| WO | 2009104107 | 8/2009 |

OTHER PUBLICATIONS

International Search Report for PCT/US2011/029341, mailed Mar. 7, 2012.

* cited by examiner

*Primary Examiner* — Shane Fang
(74) *Attorney, Agent, or Firm* — Honigman Miller Schwartz and Cohn LLP; Heidi M. Berven

(57) ABSTRACT

The invention is directed to a method for producing poly (arylene) ethers with improved particle size characteristics. The improved particle size characteristics of the polyphenylene ether include one or both of: (i) up to about 50 weight percent of particles smaller than 38 micrometers; and a (ii) mean particle size greater than 100 or more micrometers.

43 Claims, No Drawings

PROCESS FOR FORMATION OF POLY(ARYLENE ETHERS) WITH LOWER FINE PARTICLE CONTENT

BACKGROUND OF THE INVENTION

A variety of methods for preparing and isolating poly(arylene) ether homopolymers and copolymers are well known in the art. Many are described in U.S. Pat. No. 6,407,200. One established method for making the polymers involves precipitating the polymer after the conclusion of the polymerization reaction from the reaction mixture (which is usually in a solvent such as toluene) with a polymer anti-solvent such as methanol or aqueous methanol or the like with agitation (stirring or shaking or the like) and then filtering the resulting precipitate. Such a procedure is often suitable for efficiently producing high yields of the desired poly(arylene ether) polymer product. However, there are some drawbacks to the process. For example, the poly(arylene ether) powder produced by this method sometimes includes an undesirably high proportion of powder "fines"—solid particles having a particle size less than about 38 micrometers (µm).

Fines can be responsible for a variety of problems during subsequent processing of polymers. As a first matter, their presence may be associated with losses of poly(arylene ether) during filtration and drying stages. Also, fines tend to stick to processing line filters, where they can cause clogging and unacceptable variations in line pressure, excessive pressure drops, resulting in increased processing times. Filter pressure drops may trigger alarms, which shut off the powder transport through a transport line, for example, from a resin silo to a silo in a compounding area.

As a second matter, in general, the presence of high powder fines can make it difficult to efficiently separate the polymer powder from gas in drying transport systems, which results in the accumulation of fines in vent systems, and possible dust emissions into the atmosphere. Removal of the fines from the filters can be a difficult and time-consuming task. Moreover, the presence of fines can create dust explosion hazards if powder handling involves contact with air, thus necessitating the installation of expensive safety equipment.

As a third matter, in addition to transport and flow problems, the presence of fines can be problematic during subsequent compounding operations to make formulated products. For example, although they constitute part of the solid powder composition, fines often do not have the minimum solid mass and density values to ensure proper feed into an extruder.

Several approaches to reducing fine particle content during production of poly(arylene ether)s have been reported. For example, a method for preparing a poly(arylene ether) with reduced powder fine levels is also described in U.S. Pat. No. 7,205,377. The method comprises oxidatively coupling a monohydric phenol in the presence of a solvent and a complex metal catalyst, to produce a poly(arylene ether) resin and then removing a portion of the solvent to produce a concentrated solution having a cloud point $T_{cloud}$. The concentrated solution is then combined with an anti-solvent to precipitate the poly(arylene ether) in the form of a precipitation mixture. The concentrated solution usually has a temperature of at least about ($T_{cloud}$–10° C.) immediately before it is combined with the anti-solvent. The precipitation mixture has a temperature of at least about ($T_{cloud}$–40° C.) after its formation.

U.S. Pat. No. 7,151,158 discloses a method of precipitating poly(arylene ether)s with reduced fine particles. The method comprises combining at a shear rate of 50,000 to 500,000 sec$^{-1}$ a poly(arylene ether) mixture with a solvent to form a dispersion. The filtered, precipitated precipitating poly(arylene ether)s had a substantially lower content of fines U.S. Pat. No. 6,787,633 discloses an alternative method for precipitating poly(arylene ether)s with reduced fine particles involving adjustment of a single precipitation parameter after the polymer/solvent mixture is combined with the anti-solvent.

U.S. Pat. No. 6,407,200 describes a method of preparing poly(arylene ether)s, wherein a portion of the reaction solvent is removed after the catalyzed oxidative reduction step. Removal of the solvent portion leaves a concentrated solution of the polymer product. This solution is subsequently combined with an anti-solvent, to precipitate the desired polymer product. If the temperature of the concentrated solution is elevated to specified levels immediately before combination with the anti-solvent, the generation of the undesirable fines may be reduced.

U.S. Pat. No. 6,316,592 discloses a method for separating a polymer resin from a solution slurry which uses a precipitation aid such as a linear or branched polymer which absorbs onto the surface of the polymer resin particulates.

Finally, in U.S. Pat. No. 3,923,738, a method is disclosed for preparing polyphenylene ether resins with narrow particle size distribution, higher bulk density and of substantially lower content of dusty, fine particles by precipitation from an organic aromatic solvent with a non-solvent medium which is capable of forming a two-phase system with the aromatic solvent.

Despite these and other approaches, a need remains for a method to produce poly(arylene ether)s with improved particle size characteristics.

SUMMARY OF EMBODIMENTS OF THE INVENTION

This need and other needs are met by the present invention which is directed to a method for producing poly(arylene) ethers with lower fine particle content and larger mean particle size. We have found that adjustment of various processing parameters in combination, leads to lower percentages of fines and larger average particle sizes in the resulting polymer products.

Thus, in a first aspect, the invention is directed to a method for producing poly(arylene) ethers with improved particle size characteristics, the method comprising the step of:
 (a) combining a first mixture comprising a poly(arylene ether) and a solvent with an anti-solvent to form a second mixture comprising the solvent, the anti-solvent, and the poly(arylene ether); and
wherein step (a) further comprises more than one process parameter selected from the group consisting of (b), (c), (d), (e) and (f):
 (b) agitating the second mixture with a shear force generating device at an impeller tip speed of 6 m/s or less;
 (c) providing the first mixture of step (a) with a solids content of approximately 10 to approximately 50 percent by weight of the poly(arylene ether) resin;
 (d) maintaining a temperature of the second mixture at least 5° C. lower than the boiling point of the anti-solvent;
 (e) providing a ratio of the anti-solvent to the first mixture by weight of approximately 0.5:1 to approximately 4:1; and
 (f) providing the anti-solvent comprising no more than 5 percent water by weight;
wherein the improved particle size characteristics include one or both of: (i) up to about 50 weight percent of particles smaller than 38 micrometers; and a (ii) mean particle size greater than 100 or more micrometers.

In another aspect, the invention is directed to a method for producing poly(arylene) ethers comprising with improved particle size characteristics, the method comprising the steps of:
- (a) oxidatively coupling a monomer comprising monohydric phenol using an oxygen containing gas and a complex metal catalyst in a solvent to produce a first mixture of the poly(arylene ether) resin as a mixture in the solvent;
- (b) removing a portion of the solvent from the first mixture to produce a concentrated first mixture; and
- (c) combining the mixture of step (b) with an anti-solvent to form a second mixture;

wherein step (c) further comprises more than one process parameter selected from the group consisting of (d), (e), (f), (g) and (h):
- (d) agitating the second mixture with a shear force generating device at an impeller tip speed of 6 m/s or less;
- (e) providing the first admixture of step (a) with a solids content of approximately 10 to approximately 50 percent by weight of the poly(arylene ether) resin;
- (f) maintaining a temperature of the second mixture at least 5° C. lower than the boiling point of the anti-solvent;
- (g) providing a ratio of the anti-solvent to the first mixture by weight of approximately 0.5:1 to approximately 4:1; and
- (h) providing the anti-solvent comprising no more than 5 percent water by weight;

wherein the improved particle size characteristics include one or both of: (i) up to about 50 weight percent of particles smaller than 38 micrometers; and a (ii) mean particle size greater than 100 or more micrometers.

In another aspect, the invention is directed to a method for producing poly(arylene) ethers with improved particle size characteristics, the method comprising the step of:
- (a) oxidatively coupling a monomer comprising monohydric phenol using an oxygen containing gas and a complex metal catalyst in a solvent to produce a first mixture comprising a poly(arylene ether) and a solvent and then combining the first mixture with an anti-solvent to form a second mixture comprising the solvent, the anti-solvent and the poly(arylene ether)

wherein step (a) comprises more than one process parameter selected from the group consisting of (b), (c), (d), (e) and (f):
- (b) agitating the second mixture with a shear force generating device at an impeller tip speed of 6 m/s or less;
- (c) providing the first mixture of step (a) with a solids content of approximately 10 to approximately 50 percent by weight of the poly(arylene ether) resin;
- (d) maintaining a temperature of the second mixture at least 5° C. lower than the boiling point of the anti-solvent;
- (e) providing a ratio of the anti-solvent to the first mixture by weight of approximately 0.5:1 to approximately 4:1; and
- (f) providing the anti-solvent comprising no more than 5 percent water by weight;

wherein the improved particle size characteristics include one or both of (i) up to about 50 weight percent of particles smaller than 38 micrometers; and a (ii) mean particle size greater than 100 or more micrometers.

In a further aspect, the invention is directed to a polyphenylene ether comprising a poly(2,6-dimethyl-1,4-phenylene ether), wherein the polyphenylene ether contains a moiety derived from a morpholine-containing catalyst, wherein the improved particle size characteristics of the polyphenylene ether include one or both of: (i) up to about 50 weight percent of particles smaller than 38 micrometers; and a (ii) mean particle size greater than 100 or more micrometers.

In a further aspect, the invention is directed to a polyphenylene ether comprising a poly(2,6-dimethyl-1,4-phenylene ether), wherein the polyphenylene ether is essentially free of incorporated diphenoquinone residues, wherein the improved particle size characteristics of the polyphenylene ether include one or both of: (i) up to about 50 weight percent of particles smaller than 38 micrometers; and a (ii) mean particle size greater than 100 or more micrometers

DETAILED DESCRIPTION OF THE INVENTION

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other.

The use of the terms "a" and "an" and "the" and similar referents in the context of describing the invention (especially in the context of claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (that is, it includes the degree of error associated with measurement of the particular quantity).

The poly(arylene ether) polymers contemplated for use in this invention are known in the art. Many of them are described in U.S. Pat. Nos. 3,306,874; 3,306,875; 3,432,469; 4,806,602; 4,806,297; 5,294,654; 6,407,200; 7,205,307; 7,151,158; 6,787,633; and 3,923,738. As indicated, the polymers are usually prepared by oxidatively coupling a monohydric phenol using an oxygen-containing gas in the presence of a solvent and a complex metal catalyst.

For example, suitable poly(arylene ether)s include those comprising repeating structural units having the formula:

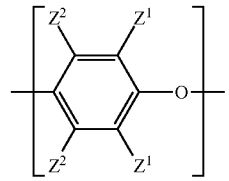

wherein at each occurrence:

$Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms;

$Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms.

As used herein, the term "hydrocarbyl", whether used by itself or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may optionally contain heteroatoms over and above the carbon and hydrogen members of the substituent residue. Thus, when specifically described as substituted, the hydrocarbyl residue can also contain one or more halogen atoms, nitro groups, cyano groups, carboxylic acid groups, ester groups, amide groups, sulfonyl groups, sulfoxyl groups, sulfonamide groups, sulfamoyl groups, alkoxyl groups, carbonyl groups, amino groups, or the like; hydroxyl groups, or the like, or it can contain heteroatoms within the backbone of the hydrocarbyl residue.

As one example, $Z^1$ can be a di-n-butylaminomethyl group formed by reaction of a terminal 3,5-dimethyl-1,4-phenyl group or an terminal 2,6-dimethyl unit with the di-n-butylamine component of an oxidative polymerization catalyst.

In some embodiments, the poly(arylene ether) has an intrinsic viscosity of about 0.25 to about 1 deciliter per gram measured at 25° C. in chloroform. Within this range, the poly(arylene ether) intrinsic viscosity can be about 0.3 to about 0.65 deciliter per gram more specifically about 0.35 to about 0.5 deciliter per gram, even more specifically about 0.4 to about 0.5 deciliter per gram.

In some embodiments, the poly(arylene ether) is characterized by a weight average molecular weight and a peak molecular weight, wherein a ratio of the weight average molecular weight to the peak molecular weight is about 1.3:1 to about 4:1. Within this range, the ratio can be about 1.5:1 to about 3:1, specifically about 1.5:1 to about 2.5:1, more specifically about 1.6:1 to about 2.3:1, still more specifically 1.7:1 to about 2.1:1. The poly(arylene ether) molecular weight distribution is typically analyzed in the molecular weight range from 250 to 1,000,000 atomic mass units. As used herein, the term "peak molecular weight" is defined as the most commonly occurring molecular weight in the molecular weight distribution. In statistical terms, the peak molecular weight is the mode of the molecular weight distribution. In practical terms, when the molecular weight is determined by a chromatographic method such as gel permeation chromatography, the peak molecular weight is the poly(arylene ether) molecular weight of the highest point in a plot of molecular weight on the x-axis versus absorbance on the y-axis. Procedures for determining a molecular weight distribution using gel permeation chromatography are known in the art.

In some embodiments, the poly(arylene ether) is a poly(2,6-dimethyl-1,4-phenylene ether) prepared with a morpholine-containing catalyst, wherein a purified sample of poly(2,6-dimethyl-1,4-phenylene ether) prepared by dissolution of the poly(2,6-dimethyl-1,4-phenylene ether) in toluene, precipitation from methanol, reslurrying, and isolation, has a monomodal molecular weight distribution in the molecular weight range of 250 to 1,000,000 atomic mass units, and comprises less than or equal to 2.2 weight percent of poly(2,6-dimethyl-1,4-phenylene ether) having a molecular weight more than fifteen times the number average molecular weight of the entire purified sample. In some embodiments, the purified sample after separation into six equal poly(2,6-dimethyl-1,4-phenylene ether) weight fractions of decreasing molecular weight comprises a first, highest molecular weight fraction comprises at least 10 mole percent of poly(2,6-dimethyl-1,4-phenylene ether) comprising a terminal morpholine-substituted phenoxy group. The poly(2,6-dimethyl-1,4-phenylene ether) according to these embodiments is further described in U.S. Patent Application Publication No. US 2011/0003962 A1 (Carrillo et. al.).

In some embodiments, the poly(arylene ether) is essentially free of incorporated diphenoquinone residues. "Diphenoquinone residues" means the dimerized moiety that may form in the oxidative polymerization reaction giving rise to the poly(arylene ethers) contemplated for use in the present invention. As described in U.S. Pat. No. 3,306,874 (Hay), synthesis of poly(arylene ethers) by oxidative polymerization of monohydric phenols yields not only the desired poly(arylene ether) but also a diphenoquinone side product. For example, when the monohydric phenol is 2,6-dimethylphenol, 3,3',5,5'-tetramethyldiphenoquinone (TMDQ) is generated. Typically, the diphenoquinone is "reequilibrated" into the poly(arylene ether) (i.e., the diphenoquinone is incorporated into the poly(arylene ether) structure) by heating the polymerization reaction mixture to yield a poly(arylene ether) comprising terminal or internal diphenoquinone residues. As used herein, "essentially free" means that fewer than 1 weight percent of poly(arylene ether) molecules comprise the residue of a diphenoquinone as measured by nuclear magnetic resonance spectroscopy (NMR) (Mole of TMDQ× Molecular Weight of unit TMDQ)/(Mole of Polymer×Number Average Molecular Weight (Mn)). In some embodiments, fewer than 0.5 weight percent of poly(arylene ether) molecules comprise the residue of a diphenoquinone.

For example, as shown in Scheme 1, when a poly(arylene ether) is prepared by oxidative polymerization of 2,6-dimethylphenol to yield poly(2,6-dimethyl-1,4-phenylene ether) and 3,3',5,5'-tetramethyldiphenoquinone, reequilibration of the reaction mixture can produce a poly(arylene ether) with terminal and internal residues of incorporated diphenoquinone.

Scheme 1

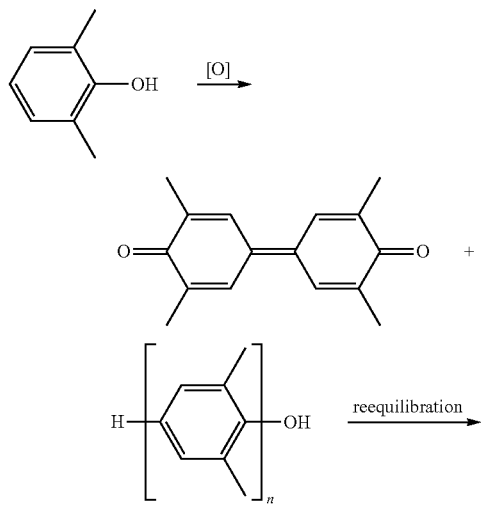

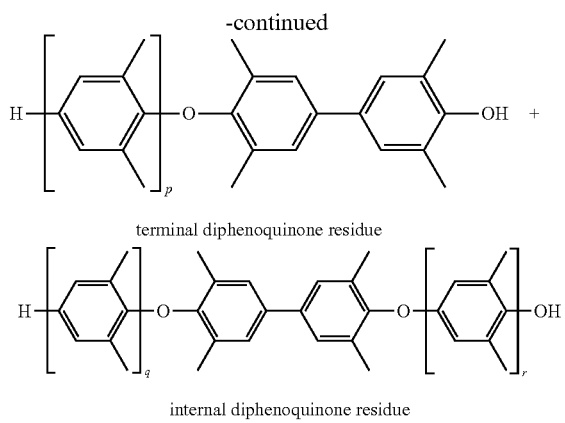

terminal diphenoquinone residue internal diphenoquinone residue

However, such re-equilibration reduces the molecular weight of the poly(arylene ether) (e.g., p and q+r are less than n). Accordingly, when a higher molecular weight and stable molecular weight poly(arylene ether) is desired, it may be desirable to separate the diphenoquinone from the poly (arylene ether) rather than re-equilibrating the diphenoquinone into the poly(arylene ether) chains. Such a separation can be achieved, for example, by precipitation of the poly (arylene ether) in a solvent or solvent mixture in which the poly(arylene ether) is insoluble and the diphenoquinone is soluble with very minimum time between end of reaction and precipitation.

For example, when a poly(arylene ether) is prepared by oxidative polymerization of 2,6-dimethylphenol in toluene to yield a toluene solution comprising poly(2,6-dimethyl-1,4-phenylene ether) and 3,3',5,5'-tetramethyldiphenoquinone, a poly(2,6-dimethyl-1,4-phenylene ether) essentially free of diphenoquinone can be obtained by mixing 1 volume of the toluene solution with about 1 to about 4 volumes of methanol or methanol water mixture. Alternatively, the amount of diphenoquinone side-product generated during oxidative polymerization can be minimized (e.g., by initiating oxidative polymerization in the presence of less than 10 weight percent of the monohydric phenol and adding at least 95 weight percent of the monohydric phenol over the course of at least 50 minutes), and/or the reequilibration of the diphenoquinone into the poly(arylene ether) chain can be minimized (e.g., by isolating the poly(arylene ether) no more than 200 minutes after termination of oxidative polymerization). These approaches are described in International Patent Application Publication No. WO2009/104107 A1 (Delsman et. al.). Alternatively, diphenoquinone amounts can be achieved by removing the TMDQ formed during polymerization by filtration, specifically after stopping the oxygen feed into the polymerization reactor In some embodiments, the poly(arylene ether) comprises 2,6-dimethyl-1,4-phenylene ether units, 2,3,6-trimethyl-1,4-phenylene ether units, or combinations thereof. In some embodiments, the poly(arylene ether) is a poly(2,6-dimethyl-1,4-phenylene ether). In some embodiments, the poly (arylene ether) comprises a poly(2,6-dimethyl-1,4-phenylene ether) having an intrinsic viscosity of about 0.35 to about 0.5 deciliter per gram, specifically about 0.35 to about 0.46 deciliter per gram, measured at 25° C. in chloroform.

The poly(arylene ether) can comprise molecules having aminoalkyl containing end group(s), typically located in a position ortho to the hydroxy group. Also frequently present are TMDQ end groups as provided earlier, which are obtained from 2,6-dimethylphenol-containing reaction mixtures in which the TMDQ by-product is present. In some embodiments the poly(arylene ether) comprises TMDQ end groups in an amount of less than about 5 weight percent, specifically less than about 3 weight percent, more specifically less than about 1 weight percent, based on the weight of the poly (arylene ether). In some embodiments, the poly(arylene ether) comprises, on average, about 0.7 to about 2 moles, specifically about 1 to about 1.5 moles, of chain-terminal hydroxyl groups per mole of poly(arylene ether). The poly (arylene ether) can be in the form of a homopolymer, a copolymer, a graft copolymer, an ionomer, or a block copolymer, as well as combinations comprising at least one of the foregoing.

As mentioned above, the monohydric phenol is oxidatively coupled in the presence of a solvent. As used herein, the term "solvent" is meant to define a single solvent, or two or more solvents mixed together). A wide variety of solvents may be employed. Non-limiting examples of suitable solvents include: aliphatic alcohols, ketones, aliphatic and aromatic hydrocarbons; chlorohydrocarbons, nitrohydrocarbons, ethers, esters, amides, mixed ether-esters, sulfoxides, and the like. Combinations which comprise at least one of the foregoing solvents may also be used, providing they do not interfere with or enter into the oxidation reaction. In a preferred embodiment, the solvent comprises a $C_6$-$C_{18}$ aromatic hydrocarbon, including, for example, toluene, xylenes, and the like, and mixtures thereof. A highly preferred solvent is toluene.

In some embodiments, the solvent further comprises at least one aliphatic alcohol that is a poor solvent for the poly (arylene ether). Non-limiting examples include $C_3$-$C_8$ aliphatic alcohols such as n-propanol, isopropanol, n-butanol, t-butanol, n-pentanol, and the like; as well as combinations comprising at least one of the foregoing aliphatic alcohols. A preferred alcohol of this type is n-butanol.

The solvent may be a mixture comprising an aromatic hydrocarbon and aliphatic alcohol in various proportions. However, it is sometimes preferred that the solvent comprise at least about 50 weight percent of the aromatic hydrocarbon. In some especially preferred embodiments, the solvent comprises at least about 75 weight percent of the aromatic hydrocarbon.

As mentioned above, the oxidative coupling reaction is carried out in the presence of a complex metal catalyst. Catalysts of this type are well-known in the art. They are described, for example, in U.S. Pat. Nos. 6,407,200; 3,306,875; 3,306,874, referenced above, as well as U.S. Pat. Nos. 5,068,310; 4,755,566; and 4,092,294.

The complex metal catalyst system usually comprises a metal ion, such as from Group VIIB, VIIB, VIII, or IB of the Periodic Table, and combinations thereof. Of these, ions of chromium, manganese, cobalt, copper, and combinations comprising at least one of the foregoing ions, may be preferred, with copper ions ($Cu^+$ and $Cu^{++}$) being highly preferred.

The complex metal catalyst system may further comprise a nitrogen-containing ligand. The nitrogen-containing ligand may include, for example, alkylenediamine ligands, primary monoamines, secondary monoamines, tertiary monoamines, aminoalcohols, oxines, combinations comprising at least one of the foregoing nitrogen-containing ligands, and the like.

A variety of specific examples of the nitrogen-containing ligands are provided in the patents referenced above, such as U.S. Pat. No. 6,407,200. Non-limiting examples of the alkylenediamine ligands include N,N'-di-t-butylethylenediamine and N,N,N',N'-tetramethyl-1,3-diaminopropane. Non-limiting examples of the primary monoamines are n-butylamine, sec-butylamine, morpholine, and cyclohexylamine, with n-butylamine being highly preferred. Non-limiting examples of the secondary amines include di-n-propylamine, di-n-butylamine, and di-t-butylamine, with di-n-butylamine often being preferred. Non-limiting examples of the tertiary amines include triethylamine, dimethyl-n-butylamine, and various cyclic tertiary amines, with dimethyl-n-butylamine being highly preferred. Non-limiting examples of suitable aminoalcohols include N,N-diethylethanolamine, triethanolamine, and N-phenylethanolamine. Non-limiting examples of the oxines include oxine and 5-methyloxine. Various combinations of any of these amines, and compositions which contain such combinations, may also be used.

Most of the nitrogen-containing ligands mentioned above, when present, may be used at about 0.01 to about 25 moles per 100 moles of monohydric phenol. The tertiary monoamines may be used at about 0.1 to about 1,500 moles per 100 moles of monohydric phenol. Selection of appropriate concentrations within these ranges may be made by those of ordinary skill in the art, without undue experimentation. The selected concentrations may reflect the presence of other reaction components or products, such as water, that may affect catalyst efficiency. A suitable molar ratio of complex metal catalyst (measured as moles of metal) to phenol is about 1:50 to about 1:400, with about 1:100 to about 1:200 often being preferred.

The complex metal catalyst system may optionally further include a halide ion, such as chloride, bromide, or iodide. When employed, halide ions may be supplied to the reaction mixture in the form of an alkali metal salt or an alkaline earth metal salt, at a concentration of about 0.1 mole to about 150 moles per 100 moles of phenolic monomer.

In some preferred embodiments, the complex metal catalyst comprises copper ion, a secondary alkylenediamine ligand, a secondary monoamine, and a tertiary monoamine. In a highly preferred embodiment, the complex metal catalyst comprises copper ion, N,N'-di-t-butylethylenediamine, di-n-butylamine, and dimethyl-n-butylamine.

Various techniques can be used to initially prepare the poly(arylene ether). In very general terms, a reaction vessel can be first be charged with the reaction solvent, a portion of the poly(arylene ether) monomer(s), the complex metal catalyst, and any other conventional components, such as surfactants and the like. A stream of oxygen or an oxygen-containing gas can then be introduced into the reaction vessel, while the remainder of the poly(arylene ether) monomer is added over a period of time. The sequence and schedule for monomer-addition can vary considerably. Polymerization can then be carried out, until a polymer with the desired molecular weight is obtained. As those skilled in the art understand, polymerization can be carried out as a bulk process or a continuous process.

The polymerization process conditions, such as reaction time, temperature, oxygen flow rate, and the like, may be modified based on the target molecular weight and monomer composition. The endpoint of the polymerization may conveniently be determined with an in-line viscosity meter. Other procedures may also be carried out during the process. Examples include: making molecular weight measurements, running to a predetermined reaction time, and controlling to a specified end group concentration.

Temperatures maintained during the polymerization stage can vary significantly, for example, from about 0° C. to about 95° C. Within this range, a polymerization temperature of at least about 25° C. is often preferred, with a preferred maximum temperature of about 55° C. At temperatures substantially higher than about 95° C., side reactions can occur, leading to reaction by-products. At temperatures substantially lower than about 0° C., ice crystals may form in the solution.

The polymerization process may further include the step of recovering the complex metal catalyst with an aqueous solution. As described in U.S. Pat. Nos. 6,407,200 and 3,838,102, a wide variety of extractants or chelating agents may be used to complex with the catalyst after the end of the polymerization reaction. When these materials are added to the poly(arylene ether) reaction solution, the complex metal catalyst becomes poisoned, and further oxidation does not take place.

Non-limiting examples of the extractants and chelating agents include sulfuric acid, acetic acid, ammonium salts, bisulfate salts, and various polyfunctional carboxylic acid-containing compounds. Preferred chelating agents for some embodiments include ethylenediaminetetraacetic acid (EDTA) or nitrilotriacetic acid (NTA), or various salts of these materials. Mixtures which comprise individual extractants or chelating agents could also be employed. Furthermore, as described in U.S. Pat. No. 6,407,200, the chelated metal catalyst can be extracted with the water produced in the polymerization reaction, by using a liquid/liquid centrifuge. Alcohols or water/alcohol mixtures are often used as the extraction liquid.

The polymerization reaction medium may comprise an aqueous environment. As described in U.S. Pat. No. 6,407,200, anti-solvents can be used in combination with the aqueous media to help drive the precipitation of the copper (I) species. The anti-solvents used in this stage are often low-molecular weight aliphatic and aromatic hydrocarbons, ketones, alcohols, and the like. Those skilled in the art would be able to select the most appropriate type and amount of anti-solvent for the polymerization stage.

A portion of the reaction solvent is then generally removed after polymerization of the poly(arylene ether), to produce a concentrated solution which may be homogeneous or may be a slurry; that is, a suspension of particles in a the solvent. This concentration step, sometimes referred to as "pre-concentration", is often carried out after removal of the complex metal catalyst.

The pre-concentration step is usually carried out to produce a concentrated solution having about 20 to about 60 weight percent of the poly(arylene ether). However, determining the most appropriate poly(arylene ether) level depends on various factors, such as the type of solvent used, and the intrinsic viscosity of the poly(arylene ether). The minimum concentration for some embodiments is preferably at least about 25 weight percent, and more preferably, at least about 30 weight percent. The maximum concentration for some embodiments is preferably about 55 weight percent, and more preferably, about 50 weight percent. In some especially preferred embodiments, the maximum weight percent is about 45 weight percent.

Any suitable method for pre-concentration may be employed. For example, the pre-concentration may be carried out by pre-heating the reaction solution above its atmospheric boiling point, at a pressure modestly elevated above about 1 atmosphere. (In this manner, no boiling takes place in the heat-exchanger typically employed). The solution can then be flashed to a lower pressure and temperature, whereby vaporization of a substantial portion of the solvent takes place. The required heat-of-vaporization is supplied by the heat transferred in the heat exchanger, as sensible heat of the solution.

The process further comprises combining the concentrated solution with an anti-solvent, so as to precipitate the poly(arylene ether). As mentioned above, the temperature of the concentrated solution is specified for the time period immediately before combination with the anti-solvent. "Immediately before" in this context means the specified temperature as it is combined with the anti-solvent. As a practical matter, the temperature of the concentrated solution may be determined at any time within about 30 seconds of mixing with the anti-solvent.

The temperature of the concentrated solution may be at least about 60° C., or at least about 70° C., or at least about 80° C., or at least about 90° C.

A variety of anti-solvents may be combined with the concentrated solution to precipitate the poly(arylene ether). There is no particular limit on the anti-solvent employed in the method. Suitable anti-solvents include alkanols having 1 to about 6 carbons such as methanol and the like; ketones having three to about ten carbon atoms, such as acetone, and the like; and alkanes having five to about ten carbon atoms, such as hexane; and the like; and combinations thereof. A preferred anti-solvent comprises methanol, ethanol, n-propanol, isopropanol, n-butanol, isobutanol, t-butanol, or the like, or a mixture thereof. In one embodiment the anti-solvent comprises methanol and at least one $C_3$-$C_6$ alkanol. Suitable $C_3$-$C_6$ alkanols include, for example, n-propanol, isopropanol, n-butanol, isobutanol, t-butanol, n-pentanol, 2-methyl-1-butanol, 2-methyl-2-butanol, 3-methyl-1-butanol, 3-methyl-2-butanol, 2,2-dimethyl-1-propanol (neopentyl alcohol), cyclopentanol, 1-hexanol, 2-hexanol, 3-hexanol, 2-methyl-1-pentanol, 2-methyl-2-pentanol, 2-methyl-3-pentanol, 4-methyl-i-pentanol, 4-methyl-2-pentanol, 3-methyl-1-pentanol, 3-methyl-2-pentanol, 3-methyl-3-pentanol, 2-ethyl-1-butanol, 2,3-dimethyl-1-butanol, 2,3-dimethyl-2-butanol, 2,2-dimethyl-1-butanol, 3,3-dimethyl-1-butanol, 3,3-dimethyl-2-butanol, cyclopentylmethanol, 1-methylcyclopentanol, 2-methylcyclopentanol, 3-methylcyclopentanol, cyclohexanol, and the like, and mixtures thereof. In another embodiment, the anti-solvent comprises (a) methanol, and (b) isopropanol, n-butanol, or a mixture thereof. A highly preferred anti-solvent comprises methanol.

A variety of types of equipment can be used to carry out the precipitation step. For example, precipitation can be carried out in a stirred tank vessel equipped with an agitation means such as a shear force generating device or the like. In one embodiment, the shear force generating device is a high-shear mixer. Suitable high shear impellers are commercially available from, for example, Wilhelm Siefer GmbH & Co., Velbert, Germany, or from IKA Works, Inc., Wilmington, N.C., USA. The shear rates during precipitation in the stirred tank and in the high shear homogenizer may be about 500 $sec^{-1}$ to about 50,000 $sec^{-1}$.

Usually, the precipitated poly(arylene ether) is then isolated, using any conventional filtration or solid/liquid separation technique. Suitable filtration apparatuses include rotating filters, continuous rotary vacuum filters, continuous moving bed filters, batch filters, and the like. Suitable solid/liquid separation apparatuses include continuous solid/liquid centrifuges.

The filtered poly(arylene ether) is then usually washed, using conventional techniques. Washing may be performed, for example, with additional anti-solvent directly on the filter. Alternatively, the "powder wet cake" from the filter or solid/liquid separation apparatus can be mixed with additional anti-solvent in a stirred tank. An alternative method of washing the filtered poly(arylene ether) uses a two-stage re-slurry and solid/liquid separation process technique. In this embodiment, the wet cake from the filter may be washed with anti-solvent in a stirred tank. The poly(arylene ether)/solvent/anti-solvent mixture can then be separated in a solid/liquid continuous centrifuge. After separation in the centrifuge, the poly(arylene ether) wet cake can be mixed a second time with anti-solvent in a continuous stirred tank, followed by a second solid/liquid separation in a second solid/liquid centrifuge.

EMBODIMENTS OF THE INVENTION

In a first aspect, the invention is directed to a method for producing poly(arylene) ethers with improved particle size characteristics, the method comprising the step of:
 (a) combining a first mixture comprising a poly(arylene ether) and a solvent with an anti-solvent to form a second mixture comprising the solvent, the anti-solvent, and the poly(arylene ether); and
wherein step (a) further comprises more than one process parameter selected from the group consisting of (b), (c), (d), (e) and (f):
 (b) agitating the second mixture with a shear force generating device at an impeller tip speed of 6 m/s or less;
 (c) providing the first mixture of step (a) with a solids content of approximately 10 to approximately 50 percent by weight of the poly(arylene ether) resin;
 (d) maintaining a temperature of the second mixture at least 5° C. lower than the boiling point of the anti-solvent;
 (e) providing a ratio of the anti-solvent to the first mixture by weight of approximately 0.5:1 to approximately 4:1; and
 (f) providing the anti-solvent comprising no more than 5 percent water by weight;
wherein the improved particle size characteristics include one or both of: (i) up to about 50 weight percent of particles smaller than 38 micrometers; and a (ii) mean particle size greater than 100 or more micrometers.

In one embodiment, the poly(arylene ether) that is used in step (a) means the precipitated, dried particulate product that is isolated from the polymerization reaction as described previously. The particle size characteristics of this particulate product may not fall within preferred particle size ranges, so resubmitting the material to precipitation process may be necessary. When the poly(arylene ether) is the precipitated, dried particles, the first step of the invention process is to combine the particles in a suitable solvent to form a first mixture. Preferably the solvent used to form the first mixture is a $C_6$-$C_{18}$ aromatic hydrocarbon solvent or the like. More preferably the solvent is toluene. The polymer is preferably taken up in a sufficient amount of solvent to provide the first mixture as a homogeneous mixture or slurry comprising the polymer and the solvent, with a specified percent solids content of the polymer by weight.

The first mixture as provided in step (a) may be warmed as needed. Preferably, the temperature of the first mixture is between approximately 30° C. and 100° C., wherein this temperature range (and those appearing elsewhere herein) includes the temperature endpoints. More preferably, the temperature of the first mixture is between approximately 40° C. and 90° C. More preferably, the temperature of the first mixture is between approximately 50° C. and 70° C.

The first mixture also can be a concentrated polymer phase from a polymerization reaction as described earlier. The solvent, temperature, and solids content described in the previous two paragraphs are operative in embodiments wherein the first mixture is such a polymer phase.

The first mixture is then combined according to step (a) with an anti-solvent to form a second mixture comprising the solvent, the anti-solvent, and the precipitated poly(arylene ether). Typically, the anti-solvent is added to the mixture comprising the polymer dissolved in the solvent. Typically, the anti-solvent is added to the vessel containing the polymer-solvent mixture, or the polymer solvent mixture is added to a vessel containing the anti-solvent. The order of addition may vary according to various processing parameters. Methods and devices for combining the polymer-solvent mixture with the anti-solvent are readily available to the skilled technician.

As indicated above the anti-solvent is selected from alkanols having 1 to about 6 carbons such as methanol and the like; ketones having three to about ten carbon atoms, such as acetone, and the like; and alkanes having five to about ten carbon atoms, such as hexane; and the like; and combinations thereof. A preferred anti-solvent comprises methanol, ethanol, n-propanol, isopropanol, n-butanol, isobutanol, t-butanol, or the like, or a mixture thereof. In one embodiment the anti-solvent comprises methanol and at least one $C_3$-$C_6$ alkanol. Suitable $C_3$-$C_6$ alkanols include, for example, n-propanol, isopropanol, n-butanol, isobutanol, t-butanol, n-pentanol, 2-methyl-1-butanol, 2-methyl-2-butanol, 3-methyl-1-butanol, 3-methyl-2-butanol, 2,2-dimethyl-1-propanol (neopentyl alcohol), cyclopentanol, 1-hexanol, 2-hexanol, 3-hexanol, 2-methyl-1-pentanol, 2-methyl-2-pentanol, 2-methyl-3-pentanol, 4-methyl-1-pentanol, 4-methyl-2-pentanol, 3-methyl-1-pentanol, 3-methyl-2-pentanol, 3-methyl-3-pentanol, 2-ethyl-1-butanol, 2,3-dimethyl-1-butanol, 2,3-dimethyl-2-butanol, 2,2-dimethyl-1-butanol, 3,3-dimethyl-1-butanol, 3,3-dimethyl-2-butanol, cyclopentylmethanol, 1-methylcyclopentanol, 2-methylcyclopentanol, 3-methylcyclopentanol, cyclohexanol, and the like, and mixtures thereof. In another embodiment, the anti-solvent comprises methanol, isopropanol, n-butanol, or a mixture thereof. A highly preferred anti-solvent comprises methanol. Preferably, the anti-solvent is methanol, and more preferably, the anti-solvent comprises about 90 percent to 100 percent by weight methanol, and about 0 to about 10 weight percent water.

Typically, combining the first mixture with the anti-solvent is conducted using a stirred tank vessel equipped with an agitation means such as a shear force generating device or the like. Typically, the agitation means is a high-shear impeller.

Process parameters (b), (c), (d), (e) and (f) were identified as having in various combinations, an advantageous affect on the particle size characteristics of the resulting polymer product when applied to step (a) of the method. In short, employing the process parameters as described below provides one or both of: (i) up to about 50 weight percent of particles smaller than 38 micrometers, (ii) a mean particle size of 100 or more micrometers.

To that end, in a further embodiment, process parameter (b) of the first aspect relates to the agitation of the mixture comprising the first mixture and the anti-solvent to form the second mixture comprising the precipitated polymer. There are many means available for agitating a mixture, including shaking, stirring, and the like. In one embodiment, the agitation is conducted using a stirred tank vessel or a high-shear impeller. In another embodiment, the first mixture and the anti-solvent are combined in a precipitation tank or the like equipped with baffles and a means for agitation such as a stirring mechanism characterized by pitched blades. In any event, the precipitation tank or stirred tank vessel that is used to combine the first mixture with the anti-solvent is equipped with a temperature control means and the necessary valves to control the rate of mixing of the first mixture with the anti-solvent and the composition of the resulting second mixture (for instance inlet valves that allow for addition of the anti-solvent and first mixture to the tank or the like, as well as outlet or draining valves).

As the agitation in the precipitation vessel is reduced, the particle size characteristics referenced above generally improve. In one embodiment, the impeller tip speed is 6 m/s or less.

In another embodiment, the impeller tip speed is 5 m/s or less.

In another embodiment, the impeller tip speed is 4 m/s or less.

In a further embodiment, the impeller tip speed is 3 m/s or less.

In a further embodiment, the impeller tip speed is 2 to 4 m/s.

Of course, the design specifications and proportions of the particular precipitation tank or vessel that is used will govern the optimal rate of agitation and will take into consideration such factors as the impeller diameter and the impeller rotational speed, as well as the impeller tip speed. To that end, the invention is meant to include those agitation rates and impeller tip speeds that are proportional and scalable to those described herein.

In a further embodiment, process parameter (c) of the first aspect relates to the solids content of the polymer solvent mixture before it is combined with the anti-solvent. As indicated previously, the polymer is taken up in a sufficient amount of solvent to provide a homogeneous mixture comprising the polymer and the solvent, and to provide a solution of the polymer in the solvent with a specified percent solids content by weight. As the solids content of the polymer-solvent mixture is increased, one or both of the particle size characteristics referenced above generally improve.

In one embodiment, the solids content is 15 to 45 percent by weight.

In another embodiment, the solids content is 20 to 40 percent by weight.

In another embodiment, the solids content is approximately 20 percent to 30 percent by weight.

In a further embodiment, the solids content is 20 percent by weight.

In a further embodiment, the solids content is 30 percent by weight.

In a further embodiment, the solids content is 40 percent by weight.

In a further embodiment, process parameter (d) of the first aspect relates to the temperature of the second mixture formed by combining the first mixture (from step (a)) and the anti-solvent, from which the polymer precipitates. As indicated previously, the polymer is combined with an aromatic hydrocarbon solvent to form the first mixture as a homogeneous mixture or a slurry.

The temperature of the first mixture, the temperature of the anti-solvent, and the final temperature of the resulting second mixture play a role in the particle size characteristics of the isolated polymer. Thus, as the final temperature of the polymer-solvent/anti-solvent mixture is reduced, one or both of the particle size characteristics referenced above generally improve.

In one embodiment, the polymer is combined with the solvent toluene at 70° C. to form the first mixture. This mixture is added to the anti-solvent maintained at a temperature that is less than 50° C., so that the final temperature of the polymer-solvent/anti-solvent mixture is less than 50° C.

In another embodiment, the temperature of the anti-solvent is between 25° C. and 49° C., thus providing a final temperature of the polymer-solvent/anti-solvent mixture of between 25° C. and 49° C. and more preferably between 25° C. and 40° C.

In a further embodiment, the temperature of the anti-solvent is between 22° C. and 38° C., thus providing a final temperature of the polymer-solvent/anti-solvent mixture of between 28° C. and 39° C.

In a further embodiment, process parameter (e) of the first aspect relates to the ratio of anti-solvent to polymer-solvent mixture by weight. As the weight ratio increases, one or both of the particle size characteristics referenced above generally improve.

Thus, in one embodiment, the ratio of anti-solvent to polymer-solvent mixture by weight is approximately 1:1 to approximately 5:1.

In another embodiment, the ratio is 1.5:1 to 4.5:1. In another embodiment, the ratio is 1.75:4.25.

In another embodiment, the ratio is 2:1 to 3:1. In another embodiment, the ratio is 2:1.

In another embodiment, the ratio is 2.5:1. In another embodiment, the ration is 3:1.

In another embodiment, the ration is 3.5:1.

In a further embodiment, process parameter (f) of the first aspect relates to the amount of water in the anti-solvent. As the amount of water in the anti-solvent decreases, one or both of the particle size characteristics referenced above generally improve.

In one embodiment, there is no water is added to the methanol (i.e., the methanol is absolute).

In another embodiment there is 0 percent to 5 percent water by weight in the methanol.

In another embodiment there is 0 percent to 3 percent water by weight in the methanol.

In another embodiment there is 0 percent to 2 percent water by weight in the methanol.

In another embodiment, step (a) of the method further comprises two or more of the process parameters selected from the group consisting of: (b), (c), (d), (e) and (f). The process parameter combinations contemplated in this embodiment comprise, for example, the following: (b) and (c); (b) and (d); (b) and (e); (b) and (f); (c) and (d); (c) and (e); (c) and (f); (d) and (e); (d) and (f); and (e) and (f).

In another embodiment, step (a) of the method further comprises three or more of the process parameters selected from the group consisting of (b), (c), (d), (e) and (f). The process parameter combinations contemplated in this embodiment comprise, for example, the following: (b), (c) and (d); (b), (c) and (e); (b), (c) and (f); (b), (d) and (e); (b), (d) and (f); (b), (e) and (f); (c), (d) and (e); (c), (d) and (f); (c), (e) and (f); and (d), (e) and (f).

In another embodiment, step (a) of the method further comprises four or more of the process parameters selected from the group consisting of (b), (c), (d), (e) and (f). The process parameter combinations contemplated in this embodiment comprise, for example, (b), (c), (d), and (e); (b), (c), (d), and (f); and (b), (c), (e), and (f); and (c), (d), (e), and (f).

In another embodiment, step (a) of the method further comprises process parameters (b), (c), (d), (e) and (f).

In a further embodiment, the method comprises one or more of the process parameters selected from the group consisting of (c), (e) and (f).

In a further embodiment of this aspect, step (a) further comprises more than one process parameters selected from the group consisting of (b), (c), (d), (e) and (f):
  (b) agitating the second mixture with a shear force generating device at an impeller tip speed of 4 m/s or less;
  (c) providing the first mixture of step (a) with a solids content of approximately 20 to approximately 30 percent by weight of the poly(arylene ether) resin;
  (d) maintaining a temperature of the second mixture between approximately 27 to 45° C.;
  (e) providing a ratio of the anti-solvent to the first mixture by weight of approximately 1:1 to 3.5:1; and
  (f) providing the anti-solvent comprising no more than 3 percent water by weight;
wherein the improved particle size characteristics of the precipitated poly(arylene) ether includes one or both of: (i) up to about 50 weight percent of particles smaller than 38 micrometers; and a (ii) mean particle size greater than 100 or more micrometers.

In a further embodiment of this aspect, step (a) further comprises more than one process parameters selected from the group consisting of (b), (c), (d), (e) and (f):
  (b) agitating the second mixture with a shear force generating device at an impeller tip speed of 3 m/s or less;
  (c) providing the first admixture of step (a) with a solids content of approximately 20 to approximately 40 percent by weight of the poly(arylene ether) resin;
  (d) maintaining a temperature of the second mixture is less than 40° C.;
  (e) providing a ratio of the anti-solvent to the first mixture by weight of approximately 1.75:1 to 3.25:1; and
  (f) providing the anti-solvent comprising no more than 2 percent water by weight;
wherein the particle size characteristics of the precipitated poly(arylene) ether includes one or both of (i) up to about 50 weight percent of particles smaller than 38 micrometers; and a (ii) mean particle size greater than 100 or more micrometers.

In a further embodiment, the invention is directed to a method for producing poly(arylene) ethers with improved particle size characteristics, the method comprising the step of:
  (a) combining a first mixture comprising a poly(arylene) ether) and a solvent with an anti-solvent to form a second mixture comprising the solvent, the anti-solvent, and the poly(arylene ether); and
wherein step (a) further comprises one or more process parameter selected from the group consisting of (b), (c), (d), (e) and (f):
  (b) agitating the second mixture with a shear force generating device at an impeller tip speed of 6 m/s or less;
  (c) providing the first mixture of step (a) with a solids content of approximately 10 to approximately 50 percent by weight of the poly(arylene ether) resin;
  (d) maintaining a temperature of the second mixture at least 5° C. lower than the boiling point of the anti-solvent;
  (e) providing a ratio of the anti-solvent to the first mixture by weight of approximately 0.5:1 to approximately 4:1; and
  (f) providing the anti-solvent comprising no more than 5 percent water by weight; and
wherein the improved particle size characteristics include one or both of: (i) up to about 50 weight percent of particles smaller than 38 micrometers; and a (ii) mean particle size greater than 100 or more micrometers.

In a further embodiment, the precipitated poly(arylene) ether contains up to approximately 40 weight percent of particles smaller than 38 micrometers.

In a further embodiment, the precipitated poly(arylene) ether particles have a mean particle size of greater than 150 micrometers.

In a further embodiment, the precipitated poly(arylene) ether contains up to approximately 30 weight percent of particles smaller than 38 micrometers.

In a further embodiment, the precipitated poly(arylene) ether particles have a mean particle size of greater than 175 micrometers.

In a further embodiment, the precipitated poly(arylene) ether contains up to approximately 20 weight percent of particles smaller than 38 micrometers.

In a further embodiment, the precipitated poly(arylene) ether particles have a mean particle size of greater than 200 micrometers.

In a further embodiment, the precipitated poly(arylene) ether comprises polyphenylene ether.

In a further embodiment, the precipitated polyphenylene ether is a poly(2,6-dimethyl-1,4-phenylene ether) prepared with a morpholine-containing catalyst, wherein the improved particle size characteristics of the polyphenylene ether include one or both of: (i) up to about 50 weight percent of particles smaller than 38 micrometers; and a (ii) mean particle size greater than 100 or more micrometers.

In a further embodiment, the precipitated polyphenylene ether is essentially free of incorporated diphenoquinone residues, wherein the improved particle size characteristics of the polyphenylene ether include one or both of: (i) up to about 50 weight percent of particles smaller than 38 micrometers; and a (ii) mean particle size greater than 100 or more micrometers.

In another embodiment, the method further comprises the step of forming the poly(arylene ether) of step (a) by oxidatively coupling a monomer comprising monohydric phenol using an oxygen containing gas and a complex metal catalyst in a solvent to produce the poly(arylene ether) resin as a mixture in the solvent. The process for preparing poly (arylene) ethers is provided above, in the Detailed Description Section of this application. The step of forming the poly (arylene ether) is meant to encompass these previously described substrate and condition variations, as well as variations incorporated by reference.

In another embodiment, the method further comprises the step of collecting the poly(arylene ether) with improved particle size characteristics from the second mixture. As indicated previously, the poly(arylene ether) particles are isolated using conventional filtration or solid/liquid separation techniques available to the skilled artisan. Suitable filtration apparatuses include rotating filters, continuous rotary vacuum filters, continuous moving bed filters, batch filters, and the like. Suitable solid/liquid separation apparatuses include continuous solid/liquid centrifuges. The filtered poly(arylene ether) is then usually washed, using conventional techniques. Washing may be performed, for example, with additional anti-solvent directly on the filter. Alternatively, the "powder wet cake" from the filter or solid/liquid separation apparatus can be mixed with additional anti-solvent in a stirred tank. Washing also includes a two-stage re-slurry and solid/liquid separation process technique. In this embodiment, the wet cake from the filter may be washed with anti-solvent in a stirred tank. The poly(arylene ether)/solvent/anti-solvent mixture can then be separated in a solid/liquid continuous centrifuge. After separation in the centrifuge, the poly(arylene ether) wet cake can be mixed a second time with anti-solvent in a continuous stirred tank, followed by a second solid/liquid separation in a second solid/liquid centrifuge.

The invention can at least further include the following embodiments.

Embodiment 1

A method for producing a poly(arylene ether) with improved particle size characteristics, the method comprising the step of:

(a) combining a first mixture comprising a poly(arylene ether) and a solvent with an anti-solvent to form a second mixture comprising the solvent, the anti-solvent, and the poly(arylene ether) with improved particle size characteristics; and wherein step (a) further comprises more than one process parameter selected from the group consisting of (b), (c), (d), (e) and (f):

(b) agitating the second mixture with a shear force generating device at an impeller tip speed of 6 m/s or less;

(c) providing the first mixture of step (a) with a solids content of approximately 10 to approximately 50 percent by weight of the poly(arylene ether) resin;

(d) maintaining a temperature of the second mixture at least 5° C. lower than the boiling point of the anti-solvent;

(e) providing a ratio of the anti-solvent to the first mixture by weight of approximately 0.5:1 to approximately 4:1; and (f) providing the anti-solvent comprising no more than 5 percent water by weight; and wherein the improved particle size characteristics includes one or both of: (i) up to about 50 weight percent of particles smaller than 38 micrometers; and a (ii) mean particle size greater than 100 or more micrometers.

Embodiment 2

The method of Embodiment 1, wherein the step (a) solvent comprises a $C_6$-$C_{18}$ aromatic hydrocarbon.

Embodiment 3

The method of Embodiments 1-2, wherein the step (a) solvent is selected from the group consisting of toluene, xylenes, and mixtures thereof.

Embodiment 4

The method of Embodiments 1-3, wherein the step (a) solvent comprises toluene.

Embodiment 5

The method of Embodiments 1-4, wherein the step (a) first mixture is a homogeneous solution comprising the poly (arylene ether) and the solvent.

Embodiment 6

The method of Embodiments 1-5, wherein the step (a) first mixture is a slurry comprising the poly(arylene ether) and the solvent.

Embodiment 7

The method of Embodiments 1-6, wherein the temperature of the first mixture is between approximately 30° C. and 100° C.

Embodiment 8

The method of Embodiments 1-7, wherein the temperature of the first mixture is between approximately 40° C. and 90° C.

Embodiment 9

The method of Embodiments 1-8, wherein the temperature of the first mixture is between approximately 50° C. and 70° C.

Embodiment 10

The method of Embodiments 1-9, wherein the anti-solvent is combined with the first mixture according to step (a) using a stirred tank vessel or high-shear mixing pump.

Embodiment 11

The method of Embodiments 1-10, wherein the anti-solvent comprises a $C_1$-$C_{10}$ aliphatic alcohol.

Embodiment 12

The method of Embodiments 1-11, wherein the anti-solvent is selected from the group consisting of methanol, ethanol, isopropanol, methanol admixed with water, ethanol admixed with water, and isopropanol admixed with water.

Embodiment 13

The method of Embodiments 1-12, wherein the anti-solvent is selected from the group consisting of methanol, or methanol admixed with water.

Embodiment 14

The method of Embodiments 1-13, wherein according to parameter (b), the impeller tip speed is 5 m/s or less.

Embodiment 15

The method of Embodiments 1-14, wherein according to parameter (b), the impeller tip speed is 4 m/s or less.

Embodiment 16

The method of Embodiments 1-15, wherein according to parameter (b), the impeller tip speed is 3 m/s or less.

Embodiment 17

The method of Embodiments 1-16, wherein according to parameter (c), the solids content of the first mixture prior to the addition of the anti-solvent is approximately 15 percent to 45 percent by weight.

Embodiment 18

The method of Embodiments 1-17, wherein according to parameter (c), the solids content of the first mixture prior to addition of the anti-solvent to form the second mixture is approximately 20 percent to 40 percent by weight.

Embodiment 19

The method of Embodiments 1-18, wherein according to parameter (c), the solids content of the first mixture is approximately 20 to 30 percent by weight.

Embodiment 20

The method of Embodiments 1-19, wherein according to parameter (c), the solids content of the first mixture is approximately 10 to 35 percent or less by weight.

Embodiment 21

The method of Embodiments 1-20, wherein according to parameter (d), the temperature of the second mixture is approximately 20 to 65° C.

Embodiment 22

The method of Embodiments 1-21, wherein according to parameter (d), the temperature of the second mixture is less than 60° C.

Embodiment 23

The method of Embodiments 1-22, wherein according to parameter (d), the temperature of the second mixture is less than 50° C.

Embodiment 24

The method of Embodiments 1-23, wherein according to parameter (d), the temperature wherein the temperature of the second mixture is less than 40° C.

Embodiment 25

The method of Embodiments 1-24, wherein according to parameter (e), the ratio of the anti-solvent to the first mixture by weight is approximately 0.75:1 to approximately 3.75:1.

Embodiment 26

The method of Embodiments 1-25, wherein according to parameter (e), the ratio of the anti-solvent to the first mixture by weight is approximately 1:1 to 3.5:1.

Embodiment 27

The method of Embodiments 1-26, wherein according to parameter (e), the ratio of the anti-solvent to the first mixture by weight is approximately is 1.75:1 to 3.25:1.

Embodiment 28

The method of Embodiments 1-27, wherein according to parameter (e), the ratio of the anti-solvent to the first mixture by weight is approximately is 2:1 to 3:1.

Embodiment 29

The method of Embodiments 1-28, wherein according to parameter (f), the anti-solvent comprises 0 percent to approximately 4.5 percent by weight of water.

Embodiment 30

The method of Embodiments 1-29, wherein according to parameter (f), the anti-solvent comprises 0 percent to approximately 3 percent by weight of water.

Embodiment 31

The method of Embodiment 1-30, wherein according to parameter (f), the anti-solvent comprises 0 percent to approximately 2 percent by weight of water.

Embodiment 32

The method of Embodiments 1-31, comprising two or more of the process parameters selected from the group consisting of (b), (c), (d), (e) and (f).

Embodiment 33

The method of Embodiments 1-32, comprising three or more of the process parameters selected from the group consisting of from (b), (c), (d), (e) and (f).

Embodiment 34

The method of Embodiments 1-33, comprising four or more of the process parameters selected from the group consisting of (b), (c), (d), (e) and (f).

Embodiment 35

The method of Embodiments 1-34, comprising process parameters (b), (c), (d), (e) and (f).

Embodiment 36

The method of Embodiments 1-35, wherein the step (a) further comprises more than one process parameter selected from the group consisting of (b), (c), (d), (e) and (f):
- (b) agitating the second mixture with a shear force generating device at an impeller tip speed of 4 m/s or less;
- (c) providing the first mixture of step (a) with a solids content of approximately 20 to approximately 30 percent by weight of the poly(arylene ether) resin;
- (d) maintaining a temperature of the second mixture between approximately 27 to 45° C.;
- (e) providing a ratio of the anti-solvent to the first mixture by weight of approximately 1:1 to 3.5:1; and
- (f) providing the anti-solvent comprising no more than 3 percent water by weight;

wherein the improved particle size characteristics include one or both of: (i) up to about 50 weight percent of particles smaller than 38 micrometers; and a (ii) mean particle size greater than 100 or more micrometers.

Embodiment 37

The method of Embodiments 1-36, wherein step (a) further comprises more than one process parameter selected from the group consisting of (b), (c), (d), (e) and (f):
- (b) agitating the second mixture with a shear force generating device at an impeller tip speed of 3 m/s or less;
- (c) providing the first mixture of step (a) with a solids content of approximately 20 to approximately 40 percent by weight of the poly(arylene ether) resin;
- (d) maintaining a temperature of the second mixture less than 40° C.;
- (e) providing a ratio of the anti-solvent to the first mixture by weight of approximately 1.75:1 to 3.25:1; and
- (f) providing the anti-solvent comprising no more than 2 percent water by weight;

wherein the improved particle size characteristics include one or both of: (i) up to about 50 weight percent of particles smaller than 38 micrometers; and a (ii) mean particle size greater than 100 or more micrometers.

Embodiment 38

The method of Embodiments 1-37, wherein the particle size characteristics include up to approximately 40 weight percent of particles smaller than 38 micrometers.

Embodiment 39

The method of Embodiments 1-38, wherein the particle size characteristics include a mean particle size of greater than 150 micrometers.

Embodiment 40

The method of Embodiments 1-39, wherein the improved particle size characteristics include up to approximately 30 weight percent of particles smaller than 38 micrometers.

Embodiment 41

The method of Embodiments 1-41, wherein the improved particle size characteristics include a mean particle size of greater than 175 micrometers.

Embodiment 42

The method of Embodiments 1-42, wherein the improved particle size characteristics include up to approximately 20 weight percent of particles smaller than 38 micrometers.

Embodiment 43

The method of Embodiments 1-43, wherein the improved particle size characteristics include a mean particle size of greater than 200 micrometers.

Embodiment 44

The method of Embodiments 1-43, wherein the poly (arylene ether) comprises polyphenylene ether.

Embodiment 45

The method of Embodiments 1-44, further comprising the step of forming the poly(arylene ether) of step (a) by oxidatively coupling a monomer comprising a monohydric phenol using an oxygen containing gas and a complex metal catalyst in a solvent to produce the poly(arylene ether) resin as a mixture in the solvent.

Embodiment 46

The method of Embodiments 1-45, further comprising the step of isolating the poly(arylene ether) with improved particle size characteristics.

Embodiment 47

A polyphenylene ether comprising a poly(2,6-dimethyl-1, 4-phenylene ether), wherein the polyphenylene ether contains a moiety derived from a morpholine-containing catalyst, wherein the improved particle size characteristics of the polyphenylene ether include one or both of: (i) up to about 50 weight percent of particles smaller than 38 micrometers; and a (ii) mean particle size greater than 100 or more micrometers.

Embodiment 48

A polyphenylene ether comprising a poly(2,6-dimethyl-1,4-phenylene ether), wherein the polyphenylene ether is essentially free of incorporated diphenoquinone residues, wherein the improved particle size characteristics of the polyphenylene ether include one or both of (i) up to about 50 weight percent of particles smaller than 38 micrometers; and a (ii) mean particle size greater than 100 or more micrometers.

Embodiment 49

A method for producing poly(arylene) ethers with improved particle size characteristics, the method comprising the step of:
  (a) oxidatively coupling a monomer comprising monohydric phenol using an oxygen containing gas and a complex metal catalyst in a solvent to produce a first mixture comprising a poly(arylene ether) and a solvent and combining the first mixture with an anti-solvent to form a second mixture comprising the solvent, the anti-solvent and the poly(arylene ether);
wherein step (a) further comprises more than one process parameter selected from the group consisting of (b), (c), (d), (e) and (f):
  (b) agitating the second mixture with a shear force generating device at an impeller tip speed of 6 m/s or less;
  (c) providing the first mixture of step (a) with a solids content of approximately 10 to approximately 50 percent by weight of the poly(arylene ether) resin;
  (d) maintaining a temperature of the second mixture at least 5° C. lower than the boiling point of the anti-solvent;
  (e) providing a ratio of the anti-solvent to the first mixture by weight of approximately 0.5:1 to approximately 4:1; and
  (f) providing the anti-solvent comprising no more than 5 percent water by weight; and
wherein the improved particle size characteristics includes one or both of: (i) up to about 50 weight percent of particles smaller than 38 micrometers; and a (ii) mean particle size greater than 100 or more micrometers.

Embodiment 50

The method of Embodiment 49, wherein the step (a) solvent comprises a $C_6$-$C_{18}$ aromatic hydrocarbon.

Embodiment 51

The method of Embodiments 49-50, wherein the step (a) solvent is selected from the group consisting of toluene, xylenes, and mixtures thereof.

Embodiment 52

The method of Embodiments 49-51, wherein the step (a) solvent comprises toluene.

Embodiment 53

The method of Embodiments 49-52, wherein the first mixture is a homogeneous solution comprising the poly(arylene ether) and the solvent.

Embodiment 54

The method of Embodiments 49-53, wherein the first mixture is a slurry comprising the poly(arylene ether) and the solvent.

Embodiment 55

The method of Embodiments 49-54, wherein the temperature of the first mixture is between approximately 30° C. and 100° C.

Embodiment 56

The method of Embodiments 49-55, wherein the temperature of the first mixture is between approximately 40° C. and 90° C.

Embodiment 57

The method of Embodiments 49-56, wherein the temperature of the first mixture is between approximately 50° C. and 70° C.

Embodiment 58

The method of Embodiments 49-57, wherein the anti-solvent is combined with the first mixture in step (a) using a stirred tank vessel or high-shear mixing pump.

Embodiment 59

The method of Embodiments 49-58, wherein the anti-solvent comprises a $C_1$-$C_{10}$ aliphatic alcohol.

Embodiment 60

The method of Embodiments 49-59, wherein the anti-solvent is selected from the group consisting of methanol, ethanol, isopropanol, methanol admixed with water, ethanol admixed with water, and isopropanol admixed with water.

Embodiment 61

The method of Embodiments 49-60, wherein the anti-solvent is selected from the group consisting of methanol, or methanol admixed with water.

Embodiment 62

The method of Embodiments 49-61, wherein according to parameter (b), the impeller tip speed is 5 m/s or less.

Embodiment 63

The method of Embodiments 49-62, wherein according to parameter (b), the impeller tip speed is 4 m/s or less.

Embodiment 64

The method of Embodiments 49-63, wherein according to parameter (b), the impeller tip speed is 3 m/s or less.

Embodiment 65

The method of Embodiments 49-64, wherein according to parameter (c), the solids content of the first mixture prior to the addition of the anti-solvent is approximately 15 percent to 45 percent by weight.

Embodiment 66

The method of Embodiments 49-65, wherein according to parameter (c), the solids content of the first mixture prior to addition of the anti-solvent to form the second mixture is approximately 20 percent to 40 percent by weight.

Embodiment 67

The method of Embodiments 49-66, wherein according to parameter (c), the solids content of the first mixture is approximately 20 to 30 percent by weight.

Embodiment 68

The method of Embodiments 49-67, wherein according to parameter (c), the solids content of the first mixture is approximately 10 to 35 percent or less by weight.

Embodiment 69

The method of Embodiments 49-68, wherein according to parameter (d), the temperature of the second mixture is approximately 20 to 65° C.

Embodiment 70

The method of Embodiments 49-69, wherein according to parameter (d), the temperature of the second mixture is less than 60° C.

Embodiment 71

The method of Embodiments 49-70, wherein according to parameter (d), the temperature of the second mixture is less than 50° C.

Embodiment 72

The method of Embodiments 49-71, wherein according to parameter (d), the temperature wherein the temperature of the second mixture is less than 40° C.

Embodiment 73

The method of Embodiments 49-72, wherein according to parameter (e), the ratio of the anti-solvent to the first mixture by weight is approximately 0.75:1 to approximately 3.75:1.

Embodiment 74

The method of Embodiments 49-73, wherein according to parameter (e), the ratio of the anti-solvent to the first mixture by weight is approximately 1:1 to 3.5:1.

Embodiment 75

The method of Embodiments 49-74, wherein according to parameter (e), the ratio of the anti-solvent to the first mixture by weight is approximately is 1.75:1 to 3.25:1.

Embodiment 76

The method of Embodiments 49-75, wherein according to parameter (e), the ratio of the anti-solvent to the first mixture by weight is approximately is 2:1 to 3:1.

Embodiment 77

The method of Embodiments 49-76, wherein according to parameter (f), the anti-solvent comprises 0 percent to approximately 4.5 percent by weight of water.

Embodiment 78

The method of Embodiments 49-77, wherein according to parameter (f), the anti-solvent comprises 0 percent to approximately 3 percent by weight of water.

Embodiment 79

The method of Embodiment 49-78, wherein according to parameter (f), the anti-solvent comprises 0 percent to approximately 2 percent by weight of water.

Embodiment 80

The method of Embodiments 49-79, comprising two or more of the process parameters selected from the group consisting of (b), (c), (d), (e) and (f).

Embodiment 81

The method of Embodiments 49-80, comprising three or more of the process parameters selected from the group consisting of from (b), (c), (d), (e) and (f).

Embodiment 82

The method of Embodiments 49-81, comprising four or more of the process parameters selected from the group consisting of (b), (c), (d), (e) and (f).

Embodiment 83

The method of Embodiments 49-82, comprising process parameters (b), (c), (d), (e) and (f).

Embodiment 84

The method of Embodiments 49-83, wherein the step (a) further comprises more than one process parameter selected from the group consisting of (b), (c), (d), (e) and (f):
- (b) agitating the second mixture with a shear force generating device at an impeller tip speed of 4 m/s or less;
- (c) providing the first mixture of step (a) with a solids content of approximately 20 to approximately 30 percent by weight of the poly(arylene ether) resin;
- (d) maintaining a temperature of the second mixture between approximately 27 to 45° C.;
- (e) providing a ratio of the anti-solvent to the first mixture by weight of approximately 1:1 to 3.5:1; and
- (f) providing the anti-solvent comprising no more than 3 percent water by weight;

wherein the improved particle size characteristics include one or both of: (i) up to about 50 weight percent of particles smaller than 38 micrometers; and a (ii) mean particle size greater than 100 or more micrometers.

Embodiment 85

The method of Embodiments 49-84, wherein step (a) further comprises more than one process parameter selected from the group consisting of (b), (c), (d), (e) and (f):
(b) agitating the second mixture with a shear force generating device at an impeller tip speed of 3 m/s or less;
(c) providing the first mixture of step (a) with a solids content of approximately 20 to approximately 40 percent by weight of the poly(arylene ether) resin;
(d) maintaining a temperature of the second mixture less than 40° C.;
(e) providing a ratio of the anti-solvent to the first mixture by weight of approximately 1.75:1 to 3.25:1; and
(f) providing the anti-solvent comprising no more than 2 percent water by weight;
wherein the improved particle size characteristics include one or both of: (i) up to about 50 weight percent of particles smaller than 38 micrometers; and a (ii) mean particle size greater than 100 or more micrometers.

Embodiment 86

The method of Embodiments 49-85, wherein the improved particle size characteristics include up to approximately 40 weight percent of particles smaller than 38 micrometers.

Embodiment 87

The method of Embodiments 49-86, wherein the improved particle size characteristics include a mean particle size of greater than 150 micrometers.

Embodiment 88

The method of Embodiments 49-87, wherein the improved particle size characteristics include up to approximately 30 weight percent of particles smaller than 38 micrometers.

Embodiment 89

The method of Embodiments 49-88, the improved particle size characteristics include a mean particle size of greater than 175 micrometers.

Embodiment 90

The method of Embodiments 49-89, wherein the improved particle size characteristics include up to approximately 20 weight percent of particles smaller than 38 micrometers.

Embodiment 91

The method of Embodiments 49-90, wherein the improved particle size characteristics include a mean particle size of greater than 200 micrometers.

Embodiment 92

The method of Embodiments 49-91, wherein the improved poly(arylene ether) comprises polyphenylene ether.

Embodiment 93

The method of Embodiments 49-92, further comprising the step of forming the poly(arylene ether) of step (a) by oxidatively coupling a monomer comprising a monohydric phenol using an oxygen containing gas and a complex metal catalyst in a solvent to produce the poly(arylene ether) resin as a mixture in the solvent.

Embodiment 94

The method of Embodiments 49-93, further comprising the step of isolating the poly(arylene ether) with improved particle size characteristics.

The following examples illustrate but do not limit the invention. Any references cited herein are incorporated by reference in their entirety.

EXAMPLES

Poly(arylene ethers) with less fines can be prepared from the separated solid particles that are collected after the work-up of the polymerization reaction, or from the intermediated polymer solution as the starting material. In either event, the poly(arylene ether) is dissolved in an aromatic hydrocarbon solvent such as toluene or the like to make a polymer solution of specified solid content. The polymer solution is then combined with an anti-solvent in a precipitation vessel at a constant flow rate and the precipitating mixture is constantly agitated. The anti-solvent is an aliphatic alcohol such as methanol or the like, optionally admixed with water.

Material Characterization:

The raw polyphenylene powder sample that is used for the precipitation studies is analyzed in the Sympatec laser diffraction sensor (Model: HELOS/KR). Particles that are 38 microns or less in size accounted for 68 wt % of the total powder. The weight percent of particles of 38 microns or less in size is reported as percent fines. The particle size range, which had the maximum amount of particles, was 0-20 microns and the mean particle size was 84.38 microns. Compressibility was calculated (29.5) from the apparent bulk density (ABD) and packed bulk density (PBD) using equation 1 and a powder flowability number (N) calculated using equation 2 (valid for 5<C<26) and equation 3 (valid for 26<C<46) was 45.5

$$C = \frac{100\ (PBD - ABD)}{PBD} \qquad \text{Eq. 1}$$

$$N = -2.11 * C + 111.46 \qquad \text{Eq. 2}$$

$$N = 0.078 * C^2 - 8.29 * C + 222.2 \qquad \text{Eq. 3}$$

Example 1

A polymer solution of polyphenylene ether in toluene ($C_7H_8$) was prepared by addition of 104.2 g of polyphenylene ether to 416.7 g (20 percent solids) at 70° C. with constant agitation till the powder was completely dissolved in the solution. The polymer solution was subsequently added to a mixture of methanol ($CH_3OH$, 1000 g) and water ($H_2O$, 41.7 g) at 25° C. in about 4-5 minutes with constant agitation in a precipitation tank with 4 baffles at 700 rpm (corresponding to an impeller tip speed of 2.51 m/s) using a 4-pitched blade with an impeller diameter of 6.8 cm and impeller diameter to tank diameter ratio of 0.44. The resulting mixture at 29.4° C. was agitated for 15 additional minutes and then filtered. The filtered powder was left for drying for 24 hours and then put in an oven at 105° C. and 20 mm Hg vacuum for 4 hours. The dried powder was analyzed using a Sympatec laser diffraction sensor. Particles with sizes less than 38 microns accounted for 19.81 weight percent of the total powder. The particle size range, which had the maximum amount of particles, was 125-210 microns and the calculated mean particle size was 195.01 microns.

The density and viscosity was estimated based on the temperature and composition of the mixture. The Reynolds number (Re) as calculated to be $5.3*10^6$ using the equation 4.

$$Re = \frac{D^2 * N * \rho}{\mu} \qquad \text{Eq. 4}$$

where, D is the diameter of the impeller, N is the number of revolutions, ρ is the density and ρ is the viscosity.

The power (P) transmitted by the impeller shaft was calculated using equation 5 and the corresponding power transmitted per unit volume was $2.9*10^8$ Watt/m³.

$$P = \frac{N_p * \rho * N^3 * D^5}{g_c} \qquad \text{Eq. 5}$$

where, $N_p$ is the power number=1.27 for the impeller used and $g_c$ is the gravitational conversion factor.

Example 1-17

Examples 1 to 17 demonstrate the trends in the effect of agitator tip speed during precipitation, anti-solvent temperature, amount of solids in the polymer solution before precipitation, ratio of anti-solvent to the polymer solution and amount of water in the anti-solvent mixture. The material charge, dissolving temperature of polymer solution, anti-solvent temperature, the temperature of the precipitating mixture upon addition of the polymer solution and the speed of agitation is specified in Tables 1(a)-(c) and the precipitation procedure from Example 1 was followed. The range of Reynolds number for Examples 1 to 17 was $5.1*10^6$ to $1.3*10^7$ and the range of the power dissipated per unit volume was $2.8*10^8$ to $3.3*10^9$ Watt/m³.

TABLE 1(a)

Effect of Material Charges and Precipitation Conditions on Precipitated Powder Characteristics (Examples 1-6).

| Example No. | 1 | 2 | 3 | 4 | 5 | 6 |
|---|---|---|---|---|---|---|
| PPE (g) | 104.2 | 200 | 66.7 | 138.9 | 100 | 208.3 |
| Toluene (g) | 416.7 | 300 | 266.7 | 208.3 | 400 | 312.5 |
| Methanol (g) | 1000 | 1000 | 1000 | 1000 | 1000 | 1000 |
| Water (g) | 41.7 | 0 | 0 | 41.7 | 0 | 41.7 |
| % solids in polymer solution | 20 | 40 | 20 | 40 | 20 | 40 |
| Water in MeOH (%) | 4 | 0 | 0 | 4 | 0 | 4 |
| Methanol/polymer solution wt. Ratio | 2 | 2 | 3 | 3 | 2 | 2 |
| Methanol/PPE ratio | 9.6 | 5 | 15 | 7.2 | 10 | 4.8 |
| Anti-solvent Temp (° C.) | 25 | 25 | 25 | 25 | 35 | 35 |
| Precipitation mixture Temp (° C.) | 29.4 | 30.6 | 29.6 | 28.6 | 37.8 | 38 |
| Impeller tip speed (m/s) | 2.51 | 2.51 | 2.51 | 2.51 | 2.51 | 2.51 |
| % fines | 19.81 | 12.4 | 10.97 | 12.8 | 13.18 | 13.65 |
| Peak range (microns) | 125-210 | 425-595 | 125-210 | 425-595 | 125-210 | 425-595 |
| Mean particle size (microns) | 195.01 | 399.85 | 404.29 | 305.76 | 326.7 | 285.41 |

TABLE 1(b)

Effect of Material Charges and Precipitation Conditions on Precipitated Powder Characteristics (Examples 7-12).

| Example No. | 7 | 8 | 9 | 10 | 11 | 12 |
|---|---|---|---|---|---|---|
| PPE (g) | 133.3 | 69.4 | 122.4 | 208.3 | 100 | 133.3 |
| Toluene (g) | 200 | 277.8 | 285.7 | 312.5 | 400 | 200 |
| Methanol (g) | 1000 | 1000 | 1000 | 1000 | 1000 | 1000 |
| Water (g) | 0 | 41.7 | 20.4 | 41.7 | 0 | 0 |
| % solids in polymer solution | 40 | 20 | 30 | 40 | 20 | 40 |
| Water in MeOH (%) | 0 | 4 | 2 | 4 | 0 | 0 |
| Methanol/polymer solution wt. Ratio | 3 | 3 | 2.5 | 2 | 2 | 3 |
| Methanol/PPE ratio | 7.5 | 14.4 | 8.17 | 4.8 | 10 | 7.5 |
| Anti-solvent Temp (° C.) | 35 | 35 | 30 | 25 | 25 | 25 |
| Precipitation mixture Temp (° C.) | 36.5 | 36.6 | 32.3 | 28.7 | 29.2 | 27.4 |
| Impeller tip speed (m/s) | 2.51 | 2.51 | 3.95 | 5.39 | 5.39 | 5.39 |
| % fines | 11.17 | 14.76 | 16.27 | 17.67 | 20.19 | 18.25 |
| Peak range (microns) | 425-595 | 125-210 | 125-210 | 0-20 | 425-595 | 425-595 |
| Mean particle size (microns) | 301.07 | 232.29 | 271.83 | 389.33 | 304.97 | 325.28 |

TABLE 1(c)

Effect of Material Charges and Precipitation Conditions on Precipitated Powder Characteristics (Examples 13-17).

| Example No. | 13 | 14 | 15 | 16 | 17 |
|---|---|---|---|---|---|
| PPE (g) | 69.4 | 200 | 104.2 | 66.7 | 138.9 |
| Toluene (g) | 277.8 | 300 | 416.7 | 266.7 | 208.3 |
| Methanol (g) | 1000 | 1000 | 1000 | 1000 | 1000 |
| Water (g) | 41.7 | 0 | 41.7 | 0 | 41.7 |
| % solids in polymer solution | 20 | 40 | 20 | 20 | 40 |
| Water in MeOH (%) | 4 | 0 | 4 | 0 | 4 |
| Methanol/polymer solution wt. Ratio | 3 | 2 | 2 | 3 | 3 |
| Methanol/PPE ratio | 14.4 | 5 | 9.6 | 15 | 7.2 |
| Anti-solvent Temp (° C.) | 25 | 35 | 35 | 35 | 35 |
| Precipitation mixture Temp (° C.) | 28.6 | 36.7 | 36.5 | 37.7 | 36.2 |
| Impeller tip speed (m/s) | 5.39 | 5.39 | 5.39 | 5.39 | 5.39 |
| % fines | 17.02 | 21.03 | 20.44 | 25.71 | 12.45 |
| Peak range (microns) | 125-210 | 0-20 | 0-20 | 0-20 | 425-595 |

TABLE 1(c)-continued

Effect of Material Charges and Precipitation Conditions
on Precipitated Powder Characteristics (Examples 13-17).

| Example No. | 13 | 14 | 15 | 16 | 17 |
|---|---|---|---|---|---|
| Mean particle size (microns) | 245.07 | 239.69 | 232.49 | 185.6 | 307.31 |

Table 2 provides the average of the percentage fines and the mean particle diameter in the precipitated powder at the different parameters studied for Table 1 grouped according to anti-solvent temperature. It is the average of the isolated parameters where the average for 25° C. is the average value of the output for examples 1-4 and 10-13 (anti-solvent temperature is 25° C.) and the average value for 35° C. is the average value of the output for examples 5-8 and 14-17.

TABLE 2

Average Percentage fine at Different Parameters
Studied in Table 1(a)-(c) (Examples 1-17).

|  | Average % fine particles | Average of Mean particle diameter (microns) |
|---|---|---|
| Anti-solvent Temp (° C.) | | |
| Ex. 1-4, 10-13 | 25 | 16.14 | 321.2 |
| Ex. 5-8, 14-17 | 35 | 16.55 | 263.8 |
| Impeller tip speed (m/s) | | |
| Ex. 1-8 | 2.51 | 13.59 | 306.3 |
| Ex. 10-17 | 5.39 | 19.10 | 278.7 |
| % Polymer in solution | | |
| Ex. 1, 3, 5, 8, 11, 13, 15-16 | 20 | 17.76 | 265.8 |
| Ex.. 2, 4, 6, 7, 10, 12, 14, 17 | 40 | 14.93 | 319.2 |
| Ratio of anti-solvent to polymer solution | | |
| Ex. 1-2, 5-6, 10-11, 14-15 | 2 | 17.30 | 296.7 |
| Ex. 3-4, 7-8, 12-13, 16-17 | 3 | 15.39 | 288.5 |
| Water in anti-solvent (%) | | |
| Ex. 2, 3, 5, 7, 11, 12, 14, 16 | 0 | 16.61 | 310.9 |
| Ex. 1, 4, 6, 8, 10, 13, 15, 17 | 4 | 16.08 | 274.1 |

Based on the results, a lower anti-solvent temperature (25° C. versus 35° C.) gives a lower percentage of fine particle content and a larger average particle size. Slower agitation speeds (2.51 m/s versus 5.39 m/s) give a lower percentage of fine particle content. A higher percent polymer in solution (40 percent versus 20 percent) leads to lower percentage of fines and bigger average size of particles in the precipitated powder. An increase in the ratio of anti-solvent to polymer solution (3:1 versus 2:1) also leads to lower percentage of fines and bigger average size of particles in the precipitated powder. An increase in the water content in the anti-solvent does not change the percentage of fines in the powder significantly but reduces the mean particle size.

Example 18-22

Examples 18-22 demonstrate the individual effect of precipitation temperature, concentration of polyphenylene ether in organic solvent, ratio of the anti-solvent to polyphenylene ether solution and ratio of the anti-solvent to polyphenylene ether itself on the particle size of the precipitated polymer. The material charge, dissolving temperature, anti-solvent temperature, temperature of the precipitating mixture, and the speed of agitation are specified in Table 3 and the procedure in Example 1 was followed. The impeller rotational speed is kept constant at 1100 rpm resulting in a constant tip speed of 3.91 m/s (impeller diameter=6.8 cm). Also, the energy input per unit mass is kept constant by keeping the total quantity of polyphenylene ether, toluene, methanol and water constant at 1350 g for all the examples. The amount of water in methanol is kept constant at 2%. The range of Reynolds number for example 1 to 22 was $5.1*10^6$ to $1.3*10^7$ and the range of the power dissipated per unit volume was $2.8*10^8$ to $3.3*10^9$ Watt/m$^3$.

TABLE 3

Effect of Material Charges and Precipitation Conditions
on Precipitated Powder Characteristics (Examples 18-22).

| Example No. | 18 | 19 | 20 | 21 | 22 |
|---|---|---|---|---|---|
| PPE (g) | 103.2 | 103.2 | 70.2 | 317.6 | 171.3 |
| Toluene (g) | 690.9 | 690.9 | 469.8 | 476.5 | 256.9 |
| Methanol (g) | 544.7 | 544.7 | 793.8 | 544.7 | 903.8 |
| Water (g) | 11.1 | 11.1 | 16.2 | 11.1 | 18.1 |
| % solids in polymer solution | 13 | 13 | 13 | 40 | 40 |
| Water in MeOH (%) | 2 | 2 | 2 | 2 | 2 |
| Methanol/polymer solution wt. Ratio | 0.7 | 0.7 | 1.5 | 0.7 | 2.11 |
| Methanol/PPE ratio | 5.3 | 5.3 | 11.3 | 1.7 | 5.3 |
| Anti-solvent Temp (° C.) | 50 | 30 | 50 | 50 | 50 |
| Precipitation mixture Temp (° C.) | 50.7 | 34.1 | 52.4 | 52.3 | 51.3 |
| Impeller tip Speed (m/s) | 3.95 | 3.95 | 3.95 | 3.95 | 3.95 |
| % fines | 14.24 | 6.91 | 10.66 | 18.21 | 7.88 |
| Peak range (microns) | 125-210 | 125-210 | 125-210 | 0-20 | 125-210 |
| Mean particle size (microns) | 166.0 | 185.08 | 236 | 164.5 | 256.6 |
| Flowability | 79.6 | 93.7 | — | — | — |

In Table 3, between Example 18 and Example 22, the impeller tip speed (3.95 m/s) and the percent water in methanol (2 percent by weight) are held constant. The results indicate that reducing the precipitation temperature, as in Example 19 compared to Example 18, reduces the percent fine particles. When the anti-solvent to polymer solution ratio is increased from 0.7 (Example 18) to 1.5 (Example 20) and to 2.11 (Example 22), the percent fine particles is reduced and the mean particle size increases. Increasing the percent solids in the polymer solution before precipitation from 13 percent (Example 18) to 40 percent (Example 22) leads to a lower percentage of fine particles and an increase in particle size. At the same time, when the methanol to polymer ratio drops to 1.7 in Example 21, the percent fines increases relative to 22, where the ratio is 5.3, respectively.

The foregoing invention has been described in some detail by way of illustration and example, for purposes of clarity and understanding. The invention has been described with reference to various specific embodiments and techniques. However, it should be understood that many variations and modifications may be made while remaining within the spirit and scope of the invention. It will be obvious to one of skill in the art that changes and modifications may be practiced within the scope of the appended claims. Therefore, it is to be understood that the above description is intended to be illustrative and not restrictive. The scope of the invention should, therefore, be determined not with reference to the above description, but should instead be determined with reference to the following appended claims, along with the full scope of equivalents to which such claims are entitled. All patents, patent applications and publications cited in this application are hereby incorporated by reference in their entirety for all purposes to the same extent as if each individual patent, patent application or publication were so individually denoted.

The invention claimed is:

1. A method for producing a poly(arylene ether) with improved particle size characteristics, the method comprising the step of:
    (a) combining a first mixture comprising a poly(arylene ether) and a solvent, wherein the solvent is selected from the group consisting of toluene, xylenes, and mixtures thereof with an anti-solvent to form a second mixture comprising the solvent, the anti-solvent, and the poly (arylene ether), wherein the anti-solvent is selected from the group consisting of methanol, ethanol, isopropanol, methanol admixed with water, ethanol admixed with water, and isopropanol admixed with water; and
wherein step (a) further comprises process parameters (b), (c), (d), (e) and (f):
    (b) agitating the second mixture with a shear force generating device at an impeller tip speed of 6 m/s or less;
    (c) providing the first mixture of step (a) with a solids content of approximately 10 to approximately 50 percent by weight of the poly(arylene ether) resin;
    (d) maintaining a temperature of the second mixture at least 5° C. lower than the boiling point of the anti-solvent;
    (e) providing a ratio of the anti-solvent to the first mixture by weight of approximately 0.5:1 to approximately 4:1; and
    (f) providing the anti-solvent comprising no more than 5 percent water by weight; and
wherein the improved particle size characteristics includes one or both of: (i) up to about 50 weight percent of particles smaller than 38 micrometers; and a (ii) mean particle size greater than 100 or more micrometers.

2. The method of claim 1, wherein the step (a) solvent comprises toluene.

3. The method of claim 1, wherein the first mixture is a homogeneous solution comprising the poly(arylene ether) and the solvent.

4. The method of claim 1, wherein the first mixture is a slurry comprising poly(arylene ether) and the solvent.

5. The method of claim 1, wherein the temperature of the first mixture in step (a) is between approximately 30° C. and 100° C.

6. The method of claim 5, wherein the temperature of the first mixture in step (a) is between approximately 40° C. and 90° C.

7. The method of claim 6, wherein the temperature of the first mixture in step (a) is between approximately 50° C. and 70° C.

8. The method of claim 1, wherein the anti-solvent in step (a) is combined with the first mixture using a stirred tank vessel or high-shear mixing pump.

9. The method of claim 1, wherein the anti-solvent is selected from the group consisting of methanol, or methanol admixed with water.

10. The method of claim 1, wherein according to parameter (b), the impeller tip speed is 5 m/s or less.

11. The method of claim 1, wherein according to parameter (b), the impeller tip speed is 4 m/s or less.

12. The method of claim 1, wherein according to parameter (b), the impeller tip speed is 3 m/s or less.

13. The method of claim 1, wherein according to parameter (c), the solids content of the first mixture prior to the addition of the anti-solvent is approximately 15 percent to 45 percent by weight.

14. The method of claim 1, wherein according to parameter (c), the solids content of the first mixture prior to addition of the anti-solvent to form the second mixture is approximately 20 percent to 40 percent by weight.

15. The method of claim 1, wherein according to parameter (c), the solids content of the first mixture is approximately 20 to 30 percent by weight.

16. The method of claim 1, wherein according to parameter (c), the solids content of the first mixture is approximately 10 to 35 percent or less by weight.

17. The method of claim 1, wherein according to parameter (d), the temperature of the second mixture is approximately 20 to 65° C.

18. The method of claim 1, wherein according to parameter (d), the temperature of the second mixture is less than 60° C.

19. The method of claim 1, wherein according to parameter (d), the temperature of the second mixture is less than 50° C.

20. The method of claim 1, wherein according to parameter (d), the temperature of the second mixture is less than 40° C.

21. The method of claim 1, wherein according to parameter (e), the ratio of the anti-solvent to the first mixture by weight is approximately 0.75:1 to approximately 3.75:1.

22. The method of claim 21, wherein according to parameter (e), the ratio of the anti-solvent to the first mixture by weight is approximately 1:1 to 3.5:1.

23. The method of claim 22, wherein according to parameter (e), the ratio of the anti-solvent to the first mixture by weight is approximately is 1.75:1 to 3.25:1.

24. The method of claim 23, wherein according to parameter (e), the ratio of the anti-solvent to the first mixture by weight is approximately is 2:1 to 3:1.

25. The method of claim 1, wherein according to parameter (f), the anti-solvent comprises 0 percent to approximately 4.5 percent by weight of water.

26. The method of claim 1, wherein according to parameter (f), the anti-solvent comprises 0 percent to approximately 3 percent by weight of water.

27. The method of claim 1, wherein according to parameter (f), the anti-solvent comprises 0 percent to approximately 2 percent by weight of water.

28. The method of claim 1, comprising two or more of the process parameters selected from the group consisting of (b), (c), (d), (e) and (f).

29. The method of claim 1, comprising three or more of the process parameters selected from the group consisting of from (b), (c), (d), (e) and (f).

30. The method of claim 1, comprising four or more of the process parameters selected from the group consisting of (b), (c), (d), (e) and (f).

31. The method of claim 1, comprising process parameters (b), (c), (d), (e) and (f):
    (b) agitating the second mixture with a shear force generating device at an impeller tip speed of 4 m/s or less;
    (c) providing the first mixture of step (a) with a solids content of approximately 20 to approximately 30 percent by weight of the poly(arylene ether) resin;
    (d) maintaining a temperature of the second mixture between approximately 27 to 45° C.;
    (e) providing a ratio of the anti-solvent to the first mixture by weight of approximately 1:1 to 3.5:1; and
    (f) providing the anti-solvent comprising no more than 3 percent water by weight;
wherein the improved particle size characteristics include one or both of: (i) up to about 50 weight percent of particles smaller than 38 micrometers; and a (ii) mean particle size greater than 100 or more micrometers.

32. The method of claim 1, comprising process parameters (b), (c), (d), (e) and (f):
- (b) agitating the second mixture with a shear force generating device at an impeller tip speed of 3 m/s or less;
- (c) providing the first mixture of step (a) with a solids content of approximately 20 to approximately 40 percent by weight of the poly(arylene ether) resin;
- (d) maintaining a temperature of the second mixture less than 40° C.;
- (e) providing a ratio of the anti-solvent to the first mixture by weight of approximately 1.75:1 to 3.25:1; and
- (f) providing the anti-solvent comprising no more than 2 percent water by weight;

wherein the improved particle size characteristics include one or both of: (i) up to about 50 weight percent of particles smaller than 38 micrometers; and a (ii) mean particle size greater than 100 or more micrometers.

33. The method of claim 1, wherein the improved particle size characteristics include up to approximately 40 weight percent of particles smaller than 38 micrometers.

34. The method of claim 1, wherein the improved particle size characteristics include a mean particle size of greater than 150 micrometers.

35. The method of claim 1, wherein the improved particle size characteristics include up to approximately 30 weight percent of particles smaller than 38 micrometers.

36. The method of claim 1, the particle size characteristics include a mean particle size of greater than 175 micrometers.

37. The method of claim 1, wherein the improved particle size characteristics include up to approximately 20 weight percent of particles smaller than 38 micrometers.

38. The method of claim 1, wherein the improved particle size characteristics include a mean particle size of greater than 200 micrometers.

39. The method of claim 1, wherein the poly(arylene ether) comprises polyphenylene ether.

40. The method of claim 1, further comprising the step of forming the poly(arylene ether) of step (a) by oxidatively coupling a monomer comprising a monohydric phenol using an oxygen containing gas and a complex metal catalyst in a solvent to produce the poly(arylene ether) resin as a mixture in the solvent.

41. The method of claim 1, further comprising the step of isolating the poly(arylene ether) with improved particle size characteristics.

42. A polyphenylene ether comprising a poly(2,6-dimethyl-1,4-phenylene ether), wherein the polyphenylene ether contains a moiety derived from a morpholine-containing catalyst, wherein the particle size characteristics of the polyphenylene ether include one or both of: (i) up to about 50 weight percent of particles smaller than 38 micrometers; and a (ii) mean particle size greater than 100 or more micrometers.

43. A polyphenylene ether comprising a poly(2,6-dimethyl-1,4-phenylene ether), wherein the polyphenylene ether is essentially free of incorporated diphenoquinone residues, wherein the particle size characteristics of the polyphenylene ether include one or both of (i) up to about 50 weight percent of particles smaller than 38 micrometers; and a (ii) mean particle size greater than 100 or more micrometers.

* * * * *